United States Patent
Deshpande

(10) Patent No.: US 11,345,362 B2
(45) Date of Patent: May 31, 2022

(54) ADAPTIVE WARNINGS AND EMERGENCY BRAKING FOR DISTRACTED DRIVERS

(71) Applicant: Robert Bosch GmbH, Stuttgart (DE)

(72) Inventor: Anup S. Deshpande, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 200 days.

(21) Appl. No.: 16/414,316

(22) Filed: May 16, 2019

(65) Prior Publication Data

US 2020/0207363 A1    Jul. 2, 2020

Related U.S. Application Data

(60) Provisional application No. 62/786,729, filed on Dec. 31, 2018.

(51) Int. Cl.
*B60W 50/08* (2020.01)
*B60W 50/14* (2020.01)
(Continued)

(52) U.S. Cl.
CPC .......... *B60W 50/085* (2013.01); *B60W 10/18* (2013.01); *B60W 40/08* (2013.01);
(Continued)

(58) Field of Classification Search
CPC .... B60W 50/085; B60W 10/18; B60W 40/08; B60W 50/14; B60W 2556/00; B60W 2050/143; B60W 2710/18; G06K 9/00845
(Continued)

(56) References Cited

U.S. PATENT DOCUMENTS 1,086,721 A * 2/1914 Kroenert et al. ......... B41F 5/24
                                                        101/182
9,937,929 B2   4/2018 Wulf
              (Continued)

FOREIGN PATENT DOCUMENTS

CN         108860154 A  * 11/2018   ............ B60W 50/14
DE      102014216201 A1 *  2/2016   ............ B60W 40/08
              (Continued)

OTHER PUBLICATIONS

A. Golovan et al., "Pre-Attentive Detection of Perceptually Important Regions in Facial Images," 2000, Publisher: IEEE.*
(Continued)

*Primary Examiner* — Tuan C To
(74) *Attorney, Agent, or Firm* — Michael Best & Friedrich LLP

(57) ABSTRACT

System and methods for a vehicle for determining driver distraction and adapting the operation of driving assistance systems. One example system includes a subsystem for sensing driver interaction with electrical devices located within a passenger compartment of the vehicle, a first sensor configured to sense conditions outside of the vehicle, a second sensor configured to sense conditions outside of the vehicle, and an electronic controller. The electronic controller is configured to determine a state of driver attentiveness based on driver interactions, provide the driver attentiveness state to a driver assistance system, determine a threshold of the driver assistance system based on the state of driver attentiveness by adjusting at least one of a sensor fusion confidence threshold, an object classification confidence threshold, a lane association threshold, blind spot detection threshold, or lane detection warning threshold; and control the vehicle via the driver assistance system operated in accordance with the threshold.

18 Claims, 7 Drawing Sheets

(51) Int. Cl.
  *B60W 40/08* (2012.01)
  *B60W 10/18* (2012.01)
(52) U.S. Cl.
  CPC ....... *B60W 50/14* (2013.01); *B60W 2050/143* (2013.01); *B60W 2556/00* (2020.02); *B60W 2710/18* (2013.01)
(58) Field of Classification Search
  USPC .......................................................... 701/70
  See application file for complete search history.

(56) References Cited

U.S. PATENT DOCUMENTS

| | | | |
|---|---|---|---|
| 10,012,993 B1 | 7/2018 | Matus et al. | |
| 10,379,535 B2* | 8/2019 | Migneco | A61B 5/6893 |
| 2008/0258884 A1* | 10/2008 | Schmitz | G01S 13/931 340/425.5 |
| 2013/0060401 A1* | 3/2013 | Hahne | B60W 30/0956 701/2 |
| 2014/0210625 A1* | 7/2014 | Nemat-Nasser | G08B 21/06 340/575 |
| 2015/0029031 A1 | 1/2015 | Pank | |
| 2015/0166059 A1 | 6/2015 | Ko | |
| 2016/0049022 A1* | 2/2016 | Offenhaeuser | G07C 5/0808 340/576 |
| 2016/0068143 A1 | 3/2016 | Schanz et al. | |
| 2017/0113664 A1* | 4/2017 | Nix | B60T 8/17558 |
| 2017/0365165 A1* | 12/2017 | Landfors | B60W 30/14 |
| 2018/0012090 A1* | 1/2018 | Herbst | G06K 9/6212 |
| 2018/0057015 A1 | 3/2018 | Barke et al. | |
| 2018/0194365 A1* | 7/2018 | Bae | B60W 10/18 |
| 2018/0204570 A1* | 7/2018 | Puranik | B60K 37/06 |
| 2019/0047588 A1* | 2/2019 | Yabuuchi | G05D 1/0088 |
| 2019/0065898 A1* | 2/2019 | Liu | G08B 21/06 |
| 2019/0168771 A1* | 6/2019 | Migneco | A61B 5/4064 |
| 2019/0279009 A1* | 9/2019 | Srirangam Narashiman | G06T 7/248 |
| 2019/0303729 A1* | 10/2019 | Gramenos | G06K 9/00832 |

FOREIGN PATENT DOCUMENTS

| | | | | |
|---|---|---|---|---|
| DE | 102016009133 A1 * | 2/2017 | | G08B 21/06 |
| DE | 102016225606 A1 * | 6/2018 | | G08G 1/09623 |
| WO | WO-2015200224 A2 * | 12/2015 | | B60W 50/0098 |

OTHER PUBLICATIONS

Joel et al., "Driver Behavior and Situation Aware Brake Assistance for Intelligent Vehicles," 2007, vol. 95, Publisher: IEEE.*
Hardeep et al, "Eye Tracking based Driver Fatigue Monitoring and Warning System," 2011, Publisher: IEEE.*

* cited by examiner ary associated with the driver assistance system (or another vehicle system).

ADAPTIVE WARNINGS AND EMERGENCY BRAKING FOR DISTRACTED DRIVERS

FIELD

Embodiments relate to automated driving functions and systems for vehicles.

BACKGROUND

Modern vehicles include various partially autonomous driving functions, for example adaptive cruise-control, collision avoidance systems, self-parking, and the like. Fully autonomous driving is a goal, but has not yet been achieved, at least on market-ready, commercially-viable scale.

SUMMARY

So-called advanced driver-assistance systems (ADASs) are designed to help reduce driver error and automate, adapt, and/or enhance vehicle systems, for example, braking systems and cruise control. Two example ADASs are forward collision warning (FCW) and automatic emergency braking (AEB) As their names imply, FCW provide a driver a warning about a potential collision with the hope that the warning will prompt the driver to take actions, such as controlling the vehicle to slow down or steering the vehicle to a new position to avoid the collision. AEB will brake a vehicle without driver action if a potential collision is detected with the hope that a collision is avoided or that the severity of a potential impact is reduced. Although ADASs have the potential for improving safety they do not always take into account driver distraction. In some cases, monitoring of inputs from driver control devices, such as a steering wheel, brake pedal, or gas (accelerator) pedal have been used as an indicator of driver distractions, such monitoring focuses on internal factors of vehicle control. For example, steering, braking, and acceleration, all control the trajectory of a vehicle. Driver distraction that occurs from external sources of distraction such as cell phone use, interactions with human-machine interfaces, such as the interface of an infotainment system, interactions with power-adjustable or electric seats, and similar activities has not, in general, been taken into account in determining how ADASs should operate.

Embodiments provide, among other things, a system and a method for adapting the operation of ADASs based on driver distraction determined from external sources.

One embodiment provides a system for a vehicle. The system includes a subsystem for sensing driver interaction with electrical devices located within a passenger compartment of the vehicle and an electronic processor connected to the subsystem. The electronic processor is configured to determine a state of driver attentiveness based on the information received from the subsystem. The state of driver attentiveness is one selected from a group consisting of a driver attentive state and a driver inattentive state. The electronic processor is configured to, in response to or after determining the driver inattentive state, provide the state of driver attentiveness to a driver assistance system. The electronic processor is also configured to determine an activation threshold of the driver assistance system based on the state of driver attentiveness by adjusting at least one selected from a group consisting of a sensor fusion confidence threshold, an object classification confidence threshold, or a lane association threshold; and control the vehicle via the driver assistance system operated in accordance with the activation threshold.

Another embodiment provides a method for operating a vehicle. The method includes determining a state of driver attentiveness based on information received from a subsystem for sensing driver interaction with electrical devices located within a passenger compartment of the vehicle. The state of driver attentiveness is one selected from a group consisting of a driver attentive state and a driver inattentive state. The method also includes providing, in response to or after determining the driver inattentive state, the state of driver attentiveness to a driver assistance system. The method also includes determining an activation threshold of the driver assistance system based on the state of driver attentiveness by adjusting at least one selected from a group consisting of a sensor fusion confidence threshold, an object classification confidence threshold, and a lane association threshold. The method also includes controlling the vehicle via the driver assistance system operated in accordance with the activation threshold.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

Figure 1:
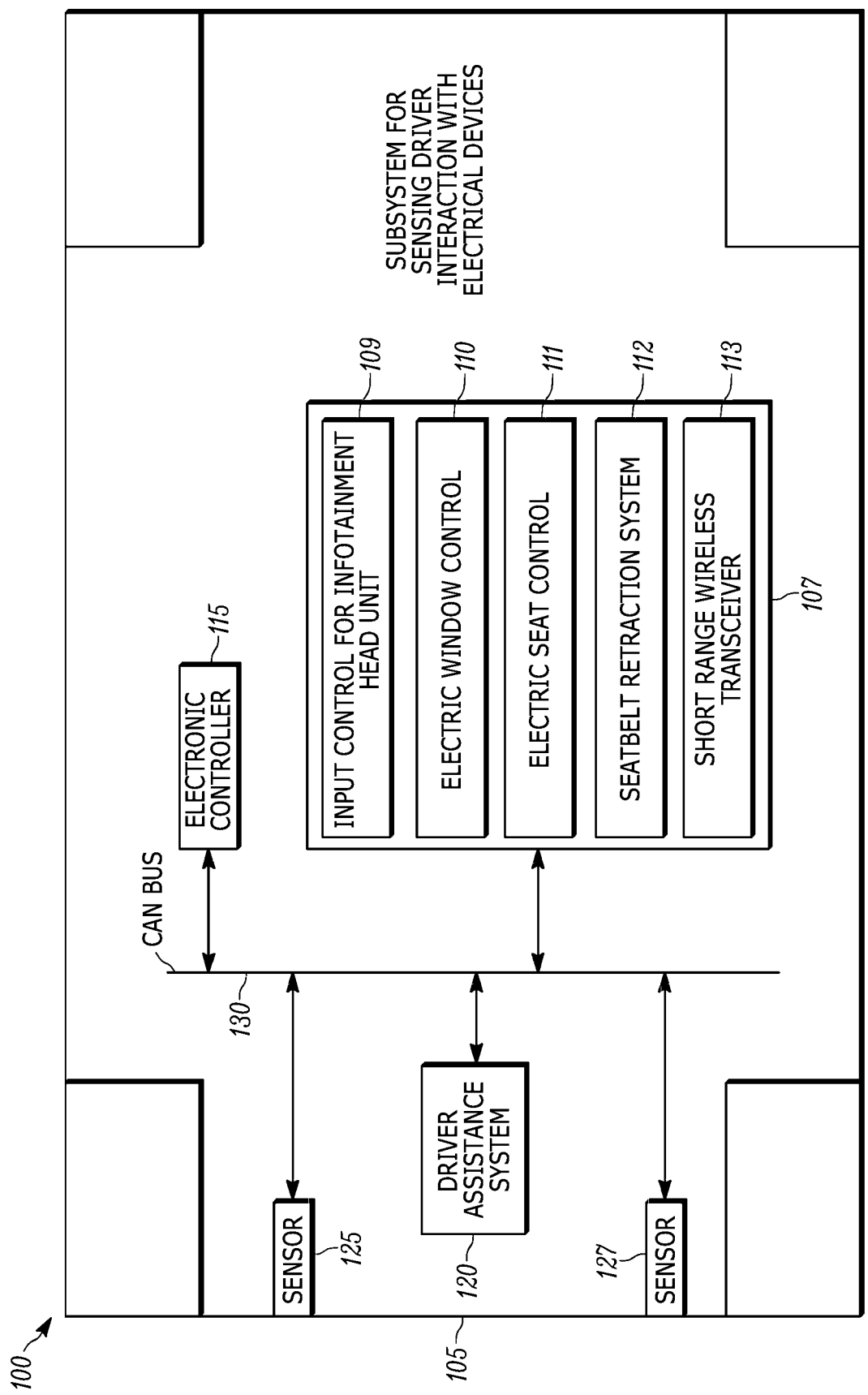
FIG. 1 is a block diagram of a system for adjusting activation thresholds based on driver attentiveness according to one embodiment.

FIG. 1 illustrates a system 100 for adjusting activation thresholds based on driver attentiveness. The system 100 includes a vehicle 105. The vehicle 105, although illustrated as a four-wheeled vehicle, may encompass various types and designs of vehicles. For example, the vehicle 105 may be an automobile, a motorcycle, a truck, a bus, a semi-tractor, and others. The vehicle 105 includes at least some autonomous functionality, but may also require a driver or operator to perform driving functions. In the example illustrated, the vehicle 105 includes several hardware components including a subsystem 107 for sensing driver interaction with electrical devices, an electronic controller 115, a driver assistance system 120, a first sensor 125, and a second sensor 127. The sensors 125 and 127 are configured to sense conditions outside of the vehicle. The subsystem 107 may include, for example, an input control for an infotainment head unit 109, an electric window control 110, an electric seat control 111, a seatbelt retraction system 112, a short-range wireless transceiver 113, and other devices that can sense interaction of a driver with systems that do not control the trajectory of a vehicle. The subsystem 107, electronic controller 115, driver assistance system 120, first sensor 125, and second sensor 127 will be described in further detail below. The components of the vehicle 105 may be of various constructions and may use various communication types and protocols.

The subsystem 107 contains electronic devices whose operational state or activity may be monitored. In the embodiment shown, the subsystem 107 is configured to monitor data from external sources that do not control the trajectory of a vehicle. In one example, each of the devices is communicatively coupled to a vehicle network, for example, a controller area network (CAN) bus 130. A driver's interaction with the electronic devices causes the devices to transmit messages on the CAN bus 130 indicative of their operation state or activity. This in turn, provides an indication of driver interaction with these devices. For example, the input control for an infotainment head unit 109 may be a volume control and activity of the volume control available on the CAN bus 130 provides an indication of driver distraction. As another example, activity of the electric window control 110 available on the CAN bus 130 also provides an indication of driver distraction. Likewise, activity of the electric seat control 111, and activity of, for example, pulling on, the seatbelt retraction system 112 provides an indication of driver inattentiveness. As yet another example, in a vehicle equipped with hands-free telephone functionality, activity of the short-range wireless transceiver 113 (for example, a Bluetooth transceiver) provides an indication of a driver using his or her cellular telephone and, therefore, inattentiveness.

The first sensor 125 is a first type of sensor (for example, a radar sensor, a light detection and ranging (LIDAR) sensor, an ultrasonic senor, or other sensor) and is configured to sense conditions outside of the vehicle. The second sensor 127 is a second type of sensor (for example, a video camera) and is also configured to sense conditions outside of the vehicle. The sensors 125 and 127 provide data to one or more of the components of the system 100 via one or more communication links and, in one example, via the CAN bus 130. The embodiment provides but one example of the sensors and connections of the vehicle 105. However, these components and connections may be constructed in other ways than those illustrated and described.

The electronic controller 115 may be communicatively connected to the subsystem 107, driver assistance system 120, first sensor 125, and second sensor 127 via various wired or wireless connections. For example, in some embodiments, the electronic controller 115 is directly coupled via a dedicated wire to each of the above-listed components of the vehicle 105. In other embodiments, the electronic controller 115 is communicatively coupled to one or more of the components via a shared communication link such as a CAN bus 130 or a wireless connection. It should be understood that each of the components of the vehicle 105 may communicate with the electronic controller 115 using various communication protocols. The embodiment illustrated in FIG. 1 provides but one example of the components and connections of the vehicle 105. However, these components and connections may be constructed in other ways than those illustrated and described herein.

Figure 2:
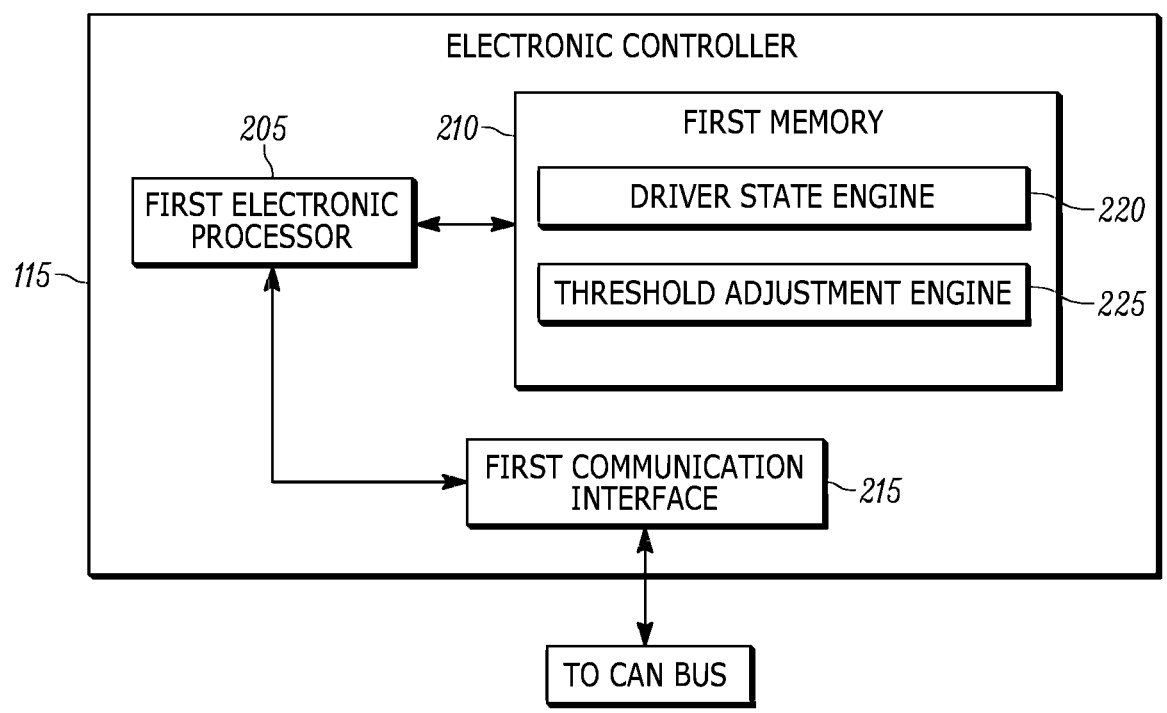
FIG. 2 is a block diagram of an electronic controller of the system of FIG. 1 according to one embodiment.

FIG. 2 is a block diagram of the electronic controller 115 of the system of FIG.1. The electronic controller 115 includes a plurality of electrical and electronic components that provide power, operation control, and protection to the components and modules within the electronic controller 115. The electronic controller 115 includes, among other things, a first electronic processor 205 (such as a programmable electronic microprocessor, microcontroller, or similar device), a first memory 210 (for example, non-transitory computer-readable memory), and a first communication interface 215. The first electronic processor 205 is communicatively connected to the first memory 210 and the first communication interface 215. The first memory includes a driver state engine 220 (for example, a set of computer-readable instructions that determine a driver state) and a threshold adjustment engine 225 (for example, a set of computer-readable instructions that determine a threshold adjustment). The first electronic processor 205, in coordination with the first memory 210 and the first communication interface 215, is configured to implement, among other things, by, for example, executing software and instructions stored in the memory described herein.

The electronic controller 115 may be implemented in several independent controllers (for example, programmable electronic controllers) each configured to perform specific functions or sub-functions. Additionally, the electronic controller 115 may contain sub-modules that include additional electronic processors, memory, or application specific integrated circuits (ASICs) for handling communication functions, processing of signals, and application of the methods listed below. In other embodiments, the electronic controller 115 includes additional, fewer, or different components.

Figure 3:
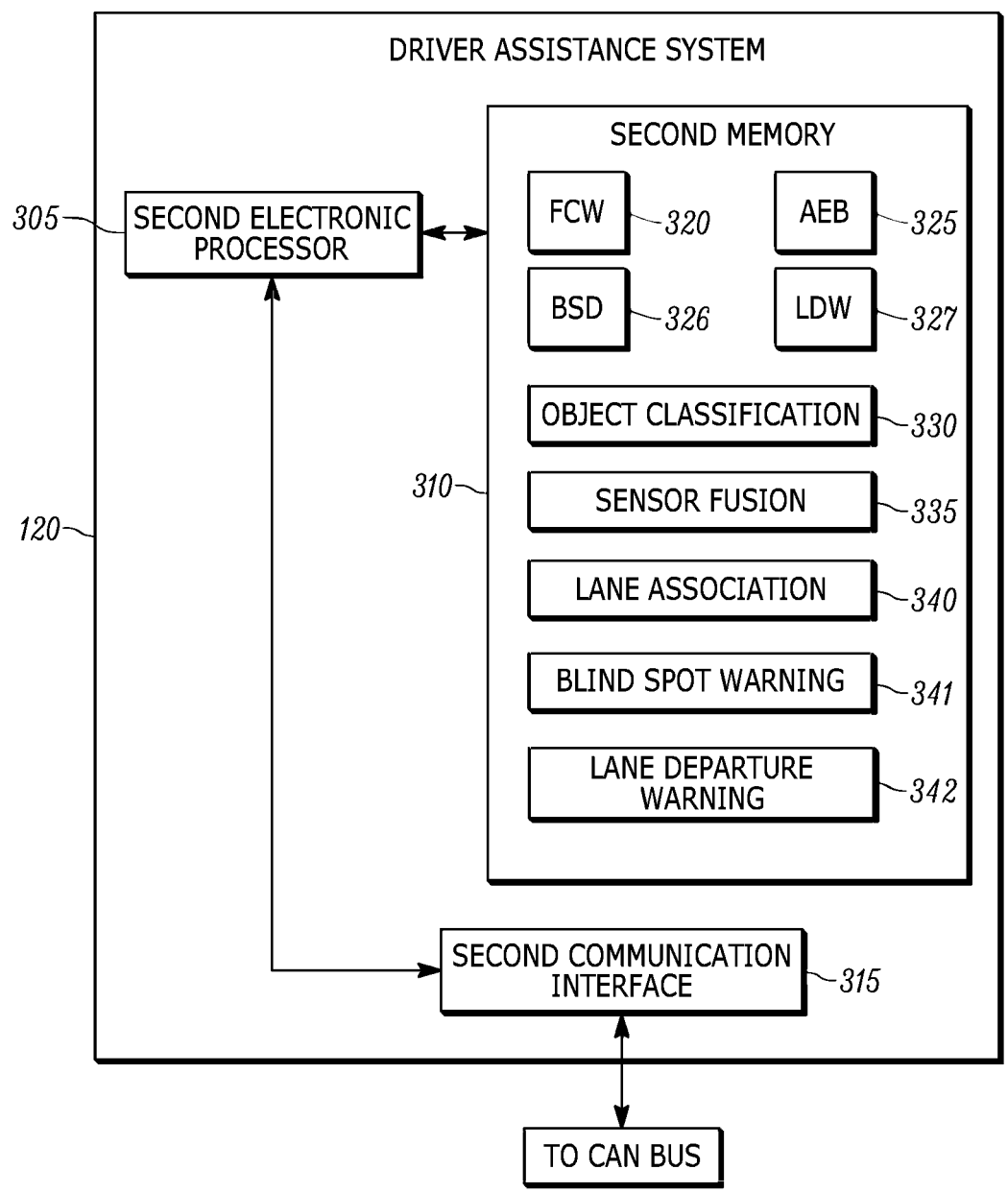
FIG. 3 is a block diagram of a driver assistance system of the system of FIG. 1 according to one embodiment.

FIG. 3 is a block diagram of the driver assistance system 120 of the vehicle 105. Among other things, the driver assistance system 120 includes, among other things, a second electronic processor 305 (such as a programmable electronic microprocessor, microcontroller, or similar device), a second memory 310 (for example, non-transitory computer-readable memory), and a second communication interface 315. In the example provided, the second memory 310 includes FCW system software 320, AEB system software 325, blind spot detection system (BSD) software 326, and lane departure warning system (LDW) software 327. The second memory 310 also includes object classification software 330, sensor fusion software 335, lane association software 340, blind spot warning software 341, and lane departure warning software 342. The second electronic processor 305, in coordination with the second memory 310 and the second communication interface 315, is configured to implement, among other things, by, for example, executing software and instructions stored in the second memory 310 the methods described herein.

The driver assistance system 120 may be implemented in several independent controllers (for example, programmable electronic controllers) each configured to perform specific functions or sub-functions. Additionally, the driver assistance system 120 may contain sub-modules that include additional electronic processors, memory, or application specific integrated circuits (ASICs) for handling communication functions, processing of signals, and application of the methods. In other embodiments, the driver assistance system 120 includes additional, fewer, or different components.

Figure 4:
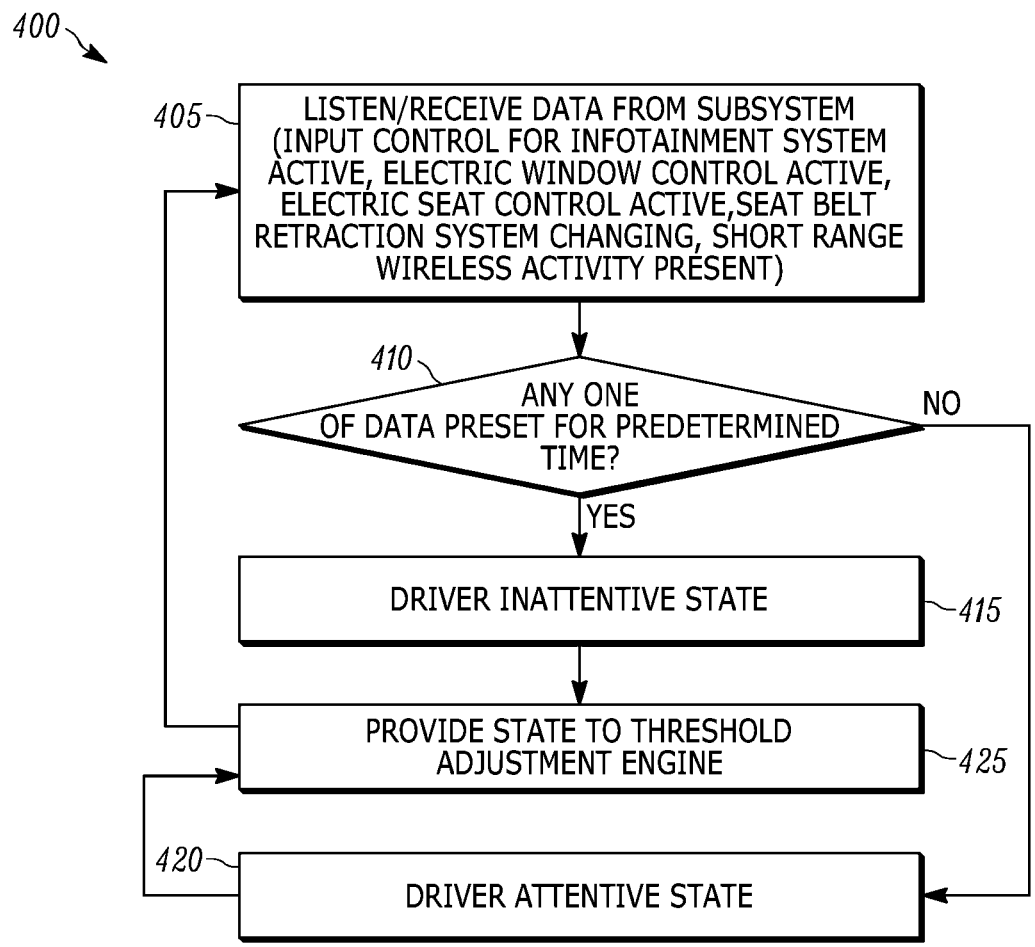
FIG. 4 is a flowchart of a method of using a driver state engine of the electronic controller of FIG. 2 to receive data and determine a driver attentiveness state according to one embodiment.

FIG. 4 illustrates an example method 400 of the driver state engine 220. While a particular order of steps is indicated in FIG. 4 as an example, the timing, sequence, and inclusion of steps may vary where appropriate without negating the purpose and advantages of the examples set forth herein.

In some embodiments, at block 405 the electronic controller 115 receives data from the subsystem 107 via the first electronic processor 205 executing an active listening process on the CAN bus 130. In other embodiments, the electronic controller 115 receives data sent directly from the subsystem 107 through the CAN bus 130. As noted above, the subsystem 107 is configured to monitor driver activity of external sources of potential driver inattentiveness. In one instance, driver inattentiveness is determined based on the presence of one or more data or flags indicating driver interaction with external sources. In other embodiments, or more complex determination is possible, for example, a weighted sum of the data or flags from external sources, in which, for example, certain data is weighted more than other data.

In the example provided, the first electronic processor 205 identifies if data is present for a predetermined period of time (block 410). If the driver state engine 220 identifies an existence of data for a predetermined period of time, the driver state engine 220 determines that the driver is currently in a driver inattentive state, block 415. If the driver state engine 220 identifies an absence of data for a predetermined period of time, the driver state engine 220 determines that the driver is currently in a driver attentive state, block 420. The driver state engine 220 provides the state to the methods of a threshold adjustment engine 225 to be executed on the first electronic processor 205, block 425. Upon providing the state to the threshold adjustment engine 225, the driver state engine will begin to listen or receive data from the subsystem 107, as illustrated in block 405.

Figure 5:
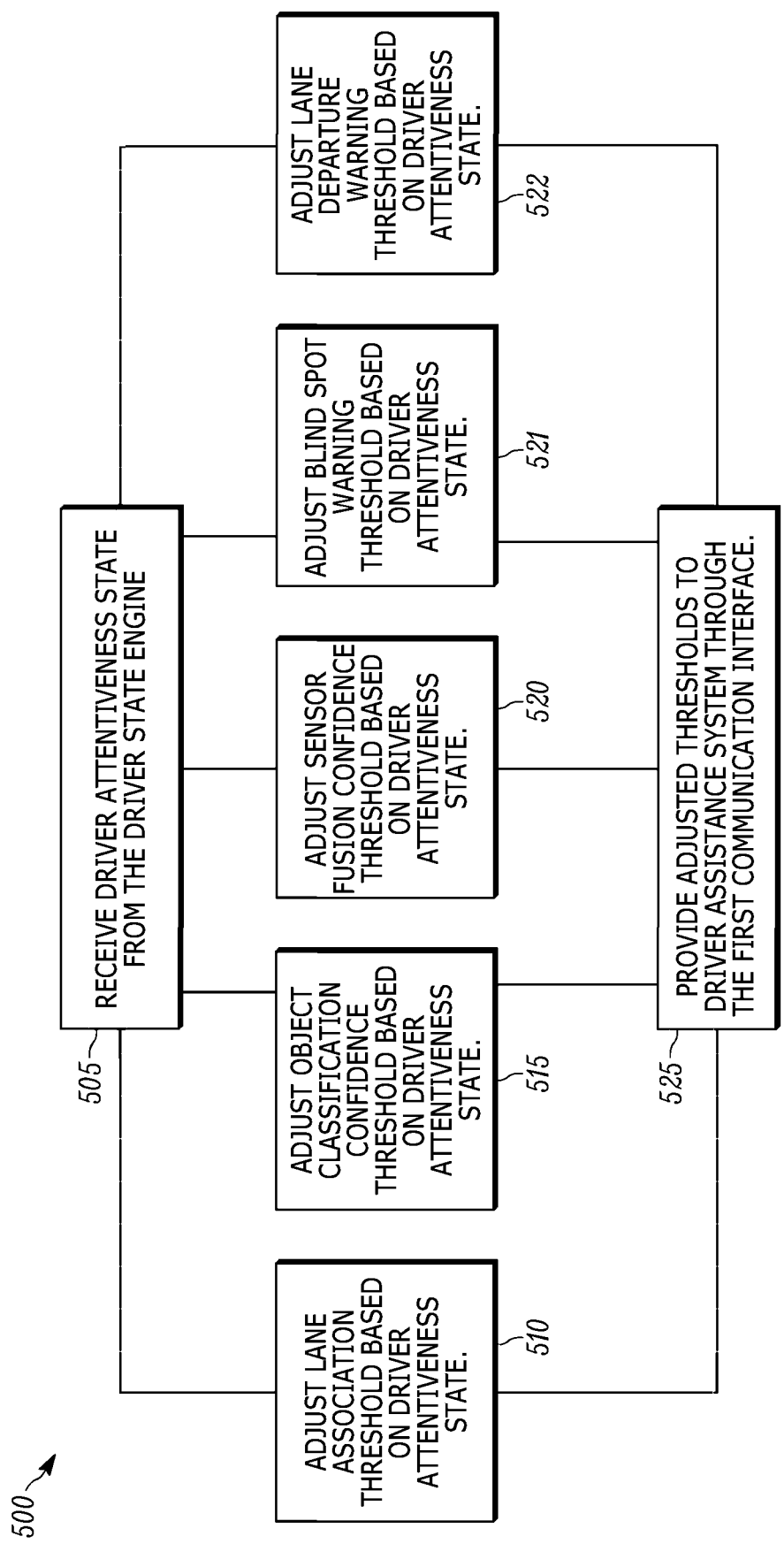
FIG. 5 is a flowchart of a method of using a threshold adjustment engine of the electronic controller of FIG. 2 to receive a driver attentiveness state from the driver state engine and to adjust an activation threshold according to one embodiment.

FIG. 5 illustrates an example method 500 of the threshold adjustment engine 225. While a particular order of steps is indicated in FIG. 5 as an example, the timing, sequence, and inclusion of steps may vary where appropriate without negating the purpose and advantages of the examples set forth herein.

At block 505 the first electronic processor 205 receives a driver attentiveness state identified by the driver state engine 220. In response to receiving (or determining) the driver attentiveness state, the electronic processor 205 makes certain adjustments as described below. At block 510, the first electronic processor 205 adjusts thresholds of the object classification software 330. At block 515, the first electronic processor 205 adjusts a threshold of the sensor fusion software 335. At block 520, the first electronic processor 205 adjusts a threshold of the lane association software 340. At block 521, the first electronic processor 205 adjusts a threshold of the blind spot warning software 341. At block 522, the first electronic processor 205 adjusts a threshold of the lane departure warning software 342. In one embodiment, all of the adjustment steps (blocks 510, 515, 520, 521, and 522) occur. However, in other embodiments a subset of the adjustment steps is carried out. For example, some embodiments include only a subset of the object classification software 330, the sensor fusion software 335, the lane association software 340, the blind spot warning software 341, and the lane departure warning software 342. In yet another embodiment, a driver attentiveness state is identified and default thresholds are provided. At block 525, the first electronic processor will provide the adjusted thresholds to the driver assistance system 120 through the first communication interface 215.

Figure 6:
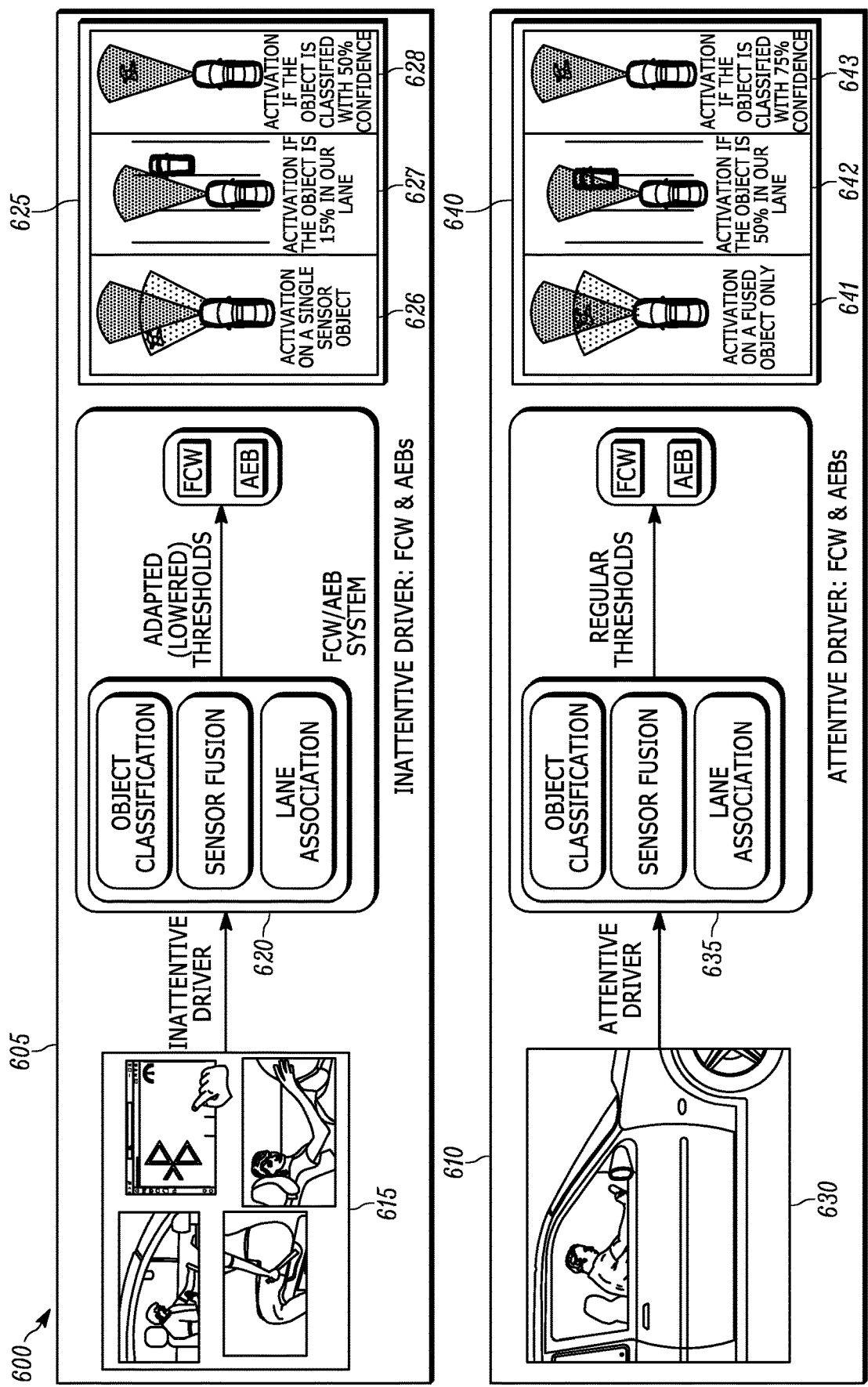
FIG. 6 is a conceptual illustration of operation of the driver assistance system of FIG. 1 for adjusting activation thresholds according to one embodiment.

FIG. 6 is a conceptual illustration of operation of the driver assistance system of FIG. 1 contrasting operation with adjusted activation thresholds that account for driver inattentiveness and operation of the driver assistance system with normal or non-adjusted activation thresholds according to one example. While example thresholds are provided in FIG. 6, the value and inclusion of the thresholds may vary from the examples set forth.

FIG. 6 includes a first scenario 605 entitled "Inattentive Driver: FCW & AEBs" that illustrates operation of the system 100 in a driver inattentive state. Image block 615 depicts various driver behaviors that are indicative of inattentiveness, including a driver using a cellular telephone, a driver adjusting a control of an infotainment system, a driver manipulating a control of an electric seat, and a seat belt tensioning system being pulled as a result of a driver looking at a rear portion of the passenger compartment. As explained above, the subsystem 107 identifies driver interaction with electronic devices within the vehicle 105 and the driver state engine 220 determines the driver to be in a driver inattentive state. Process block 620 illustrates that the sensor fusion software 335, the object classification software 330, and the lane association software 340 adjust their operation based on receiving the driver inattentive state information and that lowered thresholds are used to activate the FCW system 320, the AEB system 325, or both. Vehicle lane representations 625 illustrate example changes in operation of the sensor fusion software 335, the object classification software 330, and the lane association software 340. Vehicle lane representation 626 illustrates modification of the sensor fusion confidence value (or threshold) for a driver inattentive state where fusion confidence is adjusted to require object identification from a single sensor. Vehicle lane representation 627 illustrates modification of the lane association value (or threshold) for a driver inattentive state where an object is considered to be associated with a lane of a host vehicle if the object covers 15% of the width of the host vehicle lane, a percentage presumably lower than a normal lane overlap percentage used to activate an ADAS (when it is assumed that a driver is attentive). Vehicle lane representation 628 illustrates modification of the object classification confidence value (or threshold) for a driver inattentive state where the adjusted classification confidence is set to a value of 50%, a value presumably lower than a normal confidence value used to activate an ADAS (when it is assumed that a driver is attentive). Thus, the object classification confidence threshold is adjusted from a first confidence threshold to a second, lower threshold.

FIG. 6 also includes a second scenario 610 entitled "Attentive Driver: FCW & AEBs" that depicts operation of the system 100 in a driver attentive state. Passenger compartment image 630 illustrates a driver that is not interacting with secondary sources. As consequence, the driver state engine 220 identifies the driver to be in driver attentive state. Process block 635 illustrates that the sensor fusion software 335, the object classification software 330, and the lane association software 340 are operated using pre-set or predetermined operating parameters and that thresholds used to activate the FCW system 320 and the AEB system 325 are not adjusted. Vehicle lane representations 640 illustrate example values for the sensor fusion software 335, the object classification software 330, and the lane association software 340. Lane representation 641 illustrates the sensor fusion confidence value for a driver attentive state where fusion confidence requires object identification from two sensors. Vehicle lane representation 642 illustrates the lane association value for a driver attentive state where an object is considered to be associated with a lane of a host vehicle if the object covers 50% of the width of the host vehicle lane. Vehicle lane representation 643 illustrates the object classification confidence value for a driver attentive state where the classification confidence is set at 75%. Although specific percentage values are used for thresholds, it should be understood that these values are examples and other values can be used.

Figure 7:
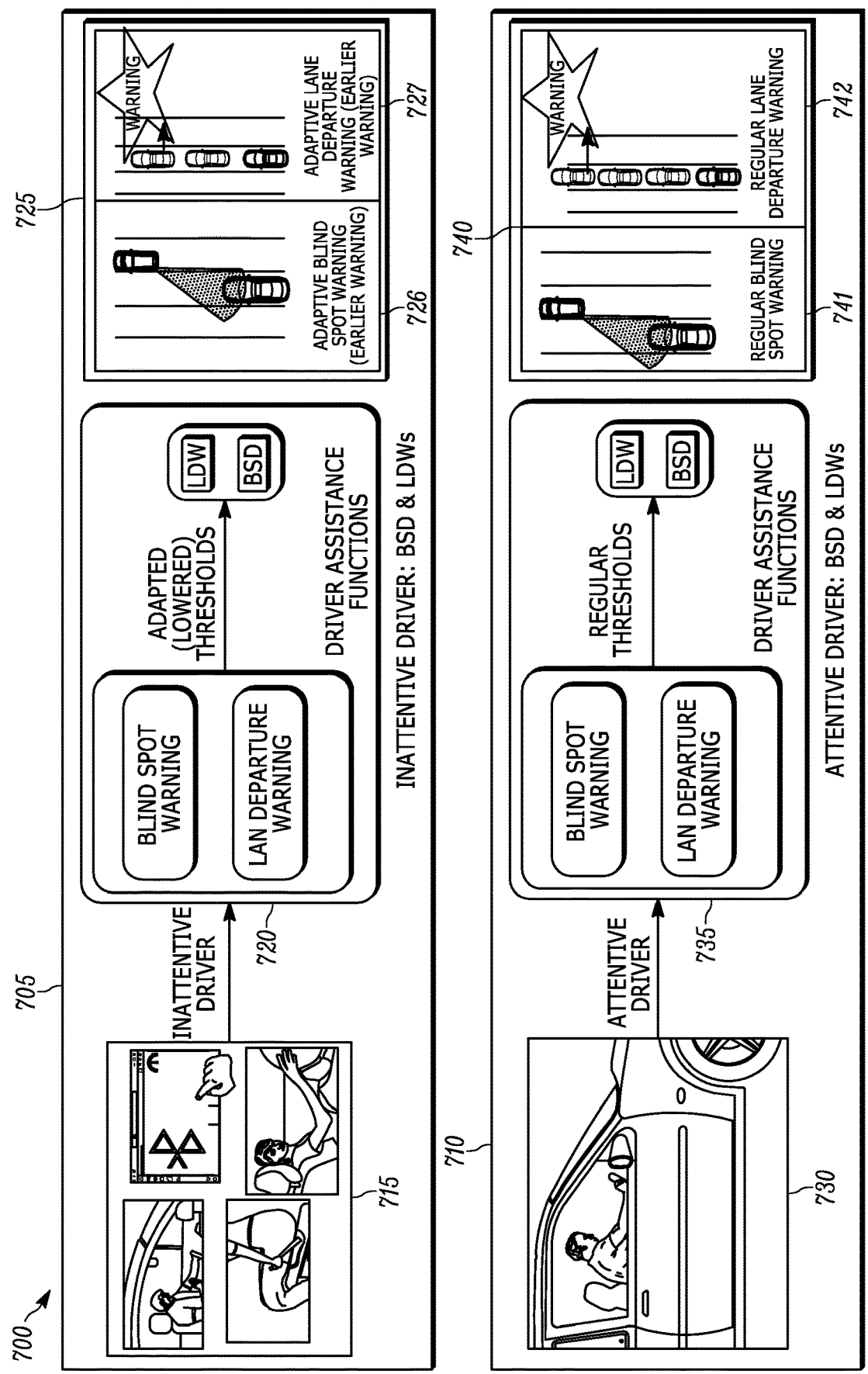
FIG. 7 is a conceptual illustration of operation of the driver assistance system of FIG. 1 for adjusting activation thresholds according to one embodiment.

FIG. 7 is a conceptual illustration of operation of the driver assistance system of FIG. 1 contrasting operation with adjusted activation thresholds that account for driver inattentiveness and operation of the driver assistance system with normal or non-adjusted activation thresholds according to one example. While example thresholds are provided in FIG. 7, the value and inclusion of the thresholds may vary from the examples set forth.

FIG. 7 includes a first scenario 705 entitled "Inattentive Driver: BSD & LDW" that illustrates operation of the system 100 in a driver inattentive state. Image block 715 depicts various driver behaviors that are indicative of inattentiveness, including a driver using a cellular telephone, a driver adjusting a control of an infotainment system, a driver manipulating a control of an electric seat, and a seat belt tensioning system being pulled as a result of a driver looking at a rear portion of the passenger compartment. Process block 720 illustrates that the blind spot warning software 341 and the lane departure warning software 342 adjust their operation based on receiving the driver inattentive state information and that lowered thresholds are used to activate the BSD system 326, the LDW system 327, or both. Vehicle lane representations 725 illustrate example values for the blind spot warning software 341 and the lane departure warning software 342. Vehicle lane representation 726 illustrates modification of a blind spot warning (or threshold) for a driver inattentive state where the BSD system 326 activates when a vehicle is detected at a larger distance than a threshold of a driver in an attentive state. Thus, the blind spot warning threshold is adjusted from a first threshold to a second threshold. Vehicle lane representation 727 illustrates modification of a lane departure warning (or threshold) for a driver inattentive state where the LDW system 327 activates when the driver's vehicle is at a larger distance from leaving a lane than a threshold of a driver in an attentive state. Thus, the lane departure warning threshold is adjusted from a first threshold to a second threshold.

FIG. 7 also includes a second scenario 710 entitled "Attentive Driver: BSD & LDW" that depicts operation of the system 100 in a driver attentive state. Passenger compartment image 730 illustrates a driver that is not interacting with secondary sources. As consequence, the driver state engine 220 identifies the driver to be in driver attentive state. Process block 735 illustrates that the blind spot warning software 341 and the lane departure warning software 342 are operated using pre-set or predetermined operating parameters and that thresholds used to activate the BSD system 326 and the LDW system 327 are not adjusted. Vehicle lane representations 740 illustrate example values for blind spot warning software 341 and the lane departure warning software 342. Vehicle lane representation 741 illustrates a blind spot warning (or threshold) for a driver attentive state where the BSD system 326 activates when a vehicle is detected at a predetermined distance that is greater than a threshold of a driver in an inattentive state. Vehicle lane representation 742 illustrates a lane departure warning (or threshold) for a driver attentive state where the LDW system 327 activates when the driver's vehicle is at a predetermined distance from leaving a lane that is greater than a threshold of a driver in an inattentive state.

Thus, the embodiments described herein provide, among other things, a system and a method for adapting the operation of ADASs based on determined driver distractions. Various features and advantages of the embodiments are set forth in the following claims.

What is claimed is:

1. A vehicle system, the system comprising:
a subsystem for sensing driver interaction with electrical devices located within a passenger compartment of a vehicle; and
an electronic processor connected to the subsystem and configured to
determine a state of driver attentiveness based on information received from the subsystem, wherein the state of driver attentiveness is one selected from a group consisting of a driver attentive state and a driver inattentive state;
in response to determining the driver inattentive state, provide the state of driver attentiveness to a driver assistance system;
determine an activation threshold of the driver assistance system based on the state of driver attentiveness by adjusting either or both of a blind spot warning threshold and a lane departure warning threshold from a first threshold to a second threshold greater than the first threshold; and
control the vehicle via the driver assistance system operated in accordance with the activation threshold.

2. The system according to claim 1 further comprising:
a first sensor of a first type and configured to sense conditions outside of the vehicle; and
a second sensor of a second type different than the first type and configured to sense conditions outside of the vehicle.

3. The system according to claim 1, wherein the electrical devices of the subsystem include an electric seat control.

4. The system according to claim 2, wherein the electrical devices transmit operational data to a control area network (CAN) bus.

5. The system according to claim 1, wherein the electronic processor is configured, in response to determining the driver inattentive state, to adjust a sensor fusion confidence threshold to require object identification from a single sensor.

6. The system according to claim 1, wherein the electronic processor is configured, in response to determining the driver inattentive state, to adjust a lane association threshold to a lower percentage of lane overlap.

7. The system according to claim 1, wherein the driver assistance system is at least one selected from a group consisting of a forward collision warning system, an automatic emergency braking system, a blind spot detection system, and a lane detection warning system.

8. The system of claim 1, wherein the electrical devices of the subsystem include an electric window control.

9. The system of claim 1, wherein the electrical devices of the subsystem include a seatbelt retraction system.

10. The system of claim 1, wherein the electrical devices of the subsystem include a short-range wireless transceiver of an infotainment system.

11. The system according to claim 1, wherein the electronic processor is configured, in response to determining the driver inattentive state, to adjust the object classification confidence threshold from a first confidence threshold to a second, lower confidence threshold.

12. A method for operating a vehicle, the method comprising:
   determining, via an electronic processor, a state of driver attentiveness based on information received from a subsystem for sensing driver interaction with electrical devices located within a passenger compartment of the vehicle, wherein the state of driver attentiveness is one selected from a group consisting of a driver attentive state and a driver inattentive state;
   in response to determining the driver inattentive state, provide the state of driver attentiveness to a driver assistance system;
   determine an activation threshold of the driver assistance system based on the state of driver attentiveness by adjusting either or both of a blind spot threshold and a lane departure warning threshold from a first threshold to a second threshold greater than the first threshold; and
   control the vehicle via the driver assistance system operated in accordance with the activation threshold.

13. The method according to claim 12, wherein the electrical devices of the subsystem include at least one selected from a group consisting of an electric window control, an electric seat control, a seatbelt retraction system; and a short-range wireless transceiver of an infotainment system.

14. The method according to claim 13, wherein the electrical devices transmit operational data to a control area network (CAN) bus.

15. The method according to claim 12, further comprising, in response to determining the driver inattentive state, adjusting a sensor fusion confidence threshold to require object identification from a single sensor.

16. The method according to claim 12, further comprising, in response to determining the driver inattentive state, adjusting a lane association threshold to a lower percentage of lane overlap.

17. The method according to claim 12, wherein the driver assistance system is at least one selected from a group consisting of a forward collision warning system, an automatic emergency braking system, a blind spot detection system, and a lane detection warning system.

18. The method according to claim 12, further comprising, in response to determining the driver inattentive state, adjusting the object classification confidence threshold from a first confidence threshold to a second, lower confidence threshold.

* * * * *